United States Patent

[11] 3,619,112

[72] Inventors Alistair Howard Berrie;
  Nigel Hughes, both of Manchester, England
[21] Appl. No. 881,310
[22] Filed Dec. 1, 1969
[45] Patented Nov. 9, 1971
[73] Assignee Imperial Chemical Industries Limited
  London, England
[32] Priority Dec. 9, 1968
[33] Great Britain
[31] 58279/68

[54] PROCESS FOR COLORING CELLULOSE ACETATE, POLYAMIDE AND POLYESTER TEXTILE MATERIALS WITH WATER-INSOLUBLE DISAZO DYESTUFFS
3 Claims, No Drawings

[52] U.S. Cl. .................................................. 8/41 R,
  8/41 B, 8/41 C, 260/156
[51] Int. Cl. .................................................. C09b 31/14,
  D06p 1/18
[50] Field of Search ...................................... 8/41 R, 41
  B, 41 C; 260/156

[56] References Cited
UNITED STATES PATENTS
3,487,066 12/1969 Ritter et al .................. 8/41 X

*Primary Examiner*—George F. Lesmes
*Assistant Examiner*—Patricia C. Ives
*Attorney*—Cushman, Darby & Cushman ABSTRACT: Process for coloring cellulose acetate, polyamide and polyester textile materials with water-insoluble disazo dyestuffs of the formula:

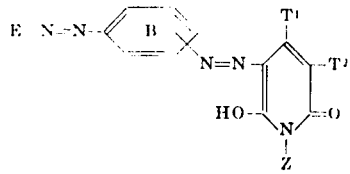

wherein E is a residue of a coupling component of the phenol, naphthol, 5-pyrazolone or acylacetarylamide series or a group of the formula:

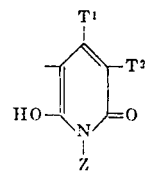

$T^1$ and $T_2$ each independently represent a hydrogen atom, an optionally substituted hydrocarbon radical or a cyano, acyl, carboxylic acid ester or amide group, Z is a hydrogen atom or an optionally substituted hydrocarbon radical, and the benzene ring B can contain substituents.

3,619,112

PROCESS FOR COLORING CELLULOSE ACETATE, POLYAMIDE AND POLYESTER TEXTILE MATERIALS WITH WATER-INSOLUBLE DISAZO DYESTUFFS

This invention relates to a coloration process for synthetic textile materials, in particular aromatic polyester textile materials.

According to the invention there is provided a process for coloring synthetic textile materials which comprises treating said textile material with an aqueous dispersion of a water-insoluble disazo dyestuff, which is free from sulfonic acid and carboxylic acid groups, and which, in one of the possible tautomeric forms, is represented by the formula:

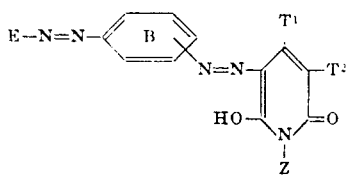

wherein E represents a residue of the formula

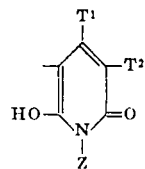

or a residue of a coupling component of the phenol, naphthol, acylacetarylamide or 5-pyrazolone series; Z represents a hydrogen atom or an alkyl, aralkyl, cycloalkyl, aryl or heterocyclic radical which may be substituted;

$T^1$ represents a hydrogen atom, a —CN, —COOR$^1$, —CONR$^1$R$^2$, —COR$^1$ or OH group or an alkyl, aralkyl, cycloalkyl, aryl or heterocyclic radical which may be substituted;

$T^2$ represents a hydrogen atom, a —CN, —COOR$^1$, —CONR$^1$R$^2$ or —COR$^1$ group or an alkyl, aralkyl, cycloalkyl, aryl or heterocyclic radical which may be substituted;

$R^1$ and $R^2$ each independently represents a hydrogen atom, an alkyl, aralkyl, cycloalkyl, aryl or heterocyclic radical which may be substituted, or the group —NR$^1$R$^2$ represents the radical of a 5 or 6 membered heterocyclic ring compound; and the benzene ring B may contain further substituents.

The disazo dyestuffs used in the process of the invention can exist in a number of tautomeric forms; for convenience the dyestuffs have only been formulated in one of these tautomeric forms, but it is to be understood that this specification relates to the use of the dyestuffs in any of the possible tautomeric forms.

As examples of further substituents which can be present on the benzene ring B there may be mentioned lower alkyl, lower alkoxy, chlorine, bromine or cyano. The two azo groups are preferably attached to the benzene ring B in meta or para position to each other.

Throughout this specification the terms "lower alkyl" and "lower alkoxy" are used to denote alkyl and alkoxy radicals respectively containing from 1 to 4 carbon atoms; and as specific examples of such radicals there may be mentioned methyl, ethyl, n-propyl and N-butyl and methoxy, ethoxy, n-propoxy and n-butoxy.

The optionally substituted alkyl radicals represented by Z, $T^1$, $T^2$, $R^1$ and $R^2$ are preferably optionally substituted lower alkyl radicals, and as specific examples of such radicals there may be mentioned methyl, ethyl, n-propyl and n-butyl, hydroxy lower alkyl such as β-hydroxyethyl, lower alkoxy lower alkyl such as β-(methoxy or ethoxy)ethyl, cyanomethyl, carbamoylmethyl, carbethoxymethyl and acetylmethyl.

As examples of aralkyl radicals represented by Z, $T^1$, $T^2$, $R^1$ and $R^2$ there may be mentioned benzyl and β-phenyl-ethyl. As an example of cycloalkyl radicals represented by Z, $T^1$, $T^2$, $R^1$ and $R^2$ there may be mentioned cyclohexyl. The optionally substituted aryl radicals represented by Z, $T^1$, $T^2$, $R^1$ and $R^2$ are preferably optionally substituted phenyl radicals and as specific examples of such radicals there may be mentioned phenyl, tolyl, chlorophenyl, methoxyphenyl and ethoxyphenyl. The optionally substituted heterocyclic radicals represented by Z, $T^1$, $T^2$, $R^1$ and $R^2$ are preferably optionally substituted 5- and 6-membered heterocyclic rings, and as specific examples of such radicals there may be mentioned 2-pyridyl, 2-thiazolyl, 1-piperidinyl and 1-morpholinyl.

As examples of 5- and 6-membered nitrogen-containing heterocyclic rings formed by joining $R^1$, $R^2$ and the nitrogen atom there may be mentioned piperidine, morpholine, piperazine and pyrrolidine.

The process of the invention may be conveniently carried out by immersing the synthetic textile material in a dyebath comprising an aqueous dispersion of a disazo dyestuff as hereinbefore defined, the dispersion being stabilized, if desired, by dispersing agents, for example nonionic dispersing agents, cationic dispersing agents, and anionic dispersing agents or a mixture of two or more such dispersing agents. Dyeing is then carried out at the temperature usually employed for the particular textile material. Thus in the case of secondary cellulose acetate textile materials it is preferred to carry out the dyeing process of a temperature between 60° and 85° C.; in the case of cellulose triacetate or polyamide textile material, it is preferred to carry out the dyeing process at 95° to 100° C.; in the case of aromatic polyester textile materials the dyeing process can either be carried out at a temperature between 90° and 100° C., preferably in the presence of a carrier such as diphenyl or o-hydroxydiphenyl, or at a temperature above 100° C., preferably at a temperature between 120° and 140° C., under superatmospheric pressure.

Alternatively an aqueous dispersion of the disazo dyestuff can be padded onto the synthetic textile material, and the dyestuff is then fixed onto the textile material by steaming it for short periods at temperatures between 100° and 160° C. or by baking it at temperatures between 160° and 220° C. If desired the padding liquor can contain the conventional additives, for example dispersing agents, thickeners, migration inhibitors, urea, or organic liquids such as benzyl alcohol.

As a further alternative a thickened printing paste containing the disazo dyestuff in dispersed form can be applied to the surface of the synthetic textile materials by any of the methods conventionally used for applying printing pastes to synthetic textile materials, for example by block, screen or roller printing. The printed textile material, optionally after being dried, is then steamed for short periods at temperatures between 100° and 160° C. or is baked at temperatures between 160° and 220° C. Suitable thickening agents which are present in the printing paste include gum tragacanth, gum arabic, alginates, or oil-in-water or water-in-oil emulsions.

If desired mixtures of the said disazo dyestuffs can be used, or there can be used mixtures of the said disazo dyestuffs with other disperse dyestuffs.

At the conclusion of the process the colored textile material is preferably rinsed in water and/or given a treatment in an aqueous solution of soap or a synthetic detergent before being dried. In the case of aromatic polyester textile materials it is also preferred to subject the colored textile material to a treatment in an alkaline aqueous solution of sodium hydrosulfite before the soaping treatment in order to remove loosely attached dyestuff from the surface of the textile material.

As examples of synthetic textile materials which can be colored by the process of the invention there may be mentioned cellulose acetate and cellulose triacetate textile materials, polyamide textile materials such as polyhexamethyleneadipamide textile materials, and preferably aromatic polyester textile materials such as polyethylene terephthalate textile materials. Such textile materials can be in the form of thread, yarn, or woven or knitted fabric. If desired the synthetic textile materials can be in the form of unions with other textile materials, for example polyester/cotton or polyester/wool unions, in which case the dyeing, padding or printing liquor usually contains a suitable dyestuff or dyestuffs for coloring any nonsynthetic textile material present in the union.

By the process of the invention synthetic textile materials can be colored in a wide variety of shades having excellent fastness to the fastness tests commonly applied to the particular textile material, for example to light, to wet treatments, and, in the case of synthetic textile materials such as aromatic polyester or cellulose triacetate textile materials to dry heat treatments. The disazo dyestuffs, as hereinbefore defined, also have excellent buildup properties on synthetic textile materials so that heavy depths of shade can be readily obtained.

The disazo dyestuffs used in the process of the invention can themselves be obtained, for example, by diazotizing a nitroamine of the formula:

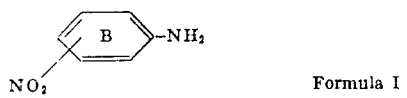

Formula I coupling the resulting diazo compound with a coupling component which, in one of the possible tautomeric forms, is of the formula:

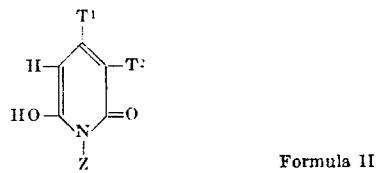

Formula II reducing the nitro group to an amino group by treatment with an aqueous solution of sodium sulfide diazotizing the resulting aminoazo compound, and coupling the diazo compound with the same or different coupling component of formula II or with a coupling component of the phenol, naphthol, acylacetarylamide or 5-pyrazolone series.

As specific examples of the nitroamines of formula I there may be mentioned m- or p-nitroaniline, 4- or 5-nitro-2 toluidine, 4- or 5- nitro-2-anisidine, 4- or 5-nitro-2-chloroaniline, 4- or 5-nitro-2-bromoaniline and 4- or 5-nitro-2-phenetidine.

The coupling components of formula II can themselves be obtained by a number of methods such as are described for example in "Heterocyclic Compounds—Pyridine and its derivatives—Part 3" which was edited by Klingsberg and published by Interscience Publishers in 1962. Typical methods include, for example, (1) condensing together compounds of the formula $T^1COCH_2COO$ alkyl and $T^2CH_2COO$ alkyl in the presence of an excess of an amine of the formula $Z-NH_2$, (2) cyclization of an $\alpha:\beta$-disubstituted glutaconamide of the formula

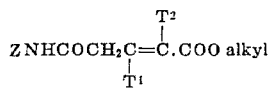

, which is itself obtained by condensing together in the presence of a basic catalyst compounds of the formulas $T^1COCH_2COO$ alkyl and $T^2CH_2CONHZ$, or (3) cyclization of an $\alpha:\beta$-disubstituted glutaconamide of the formula:

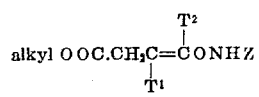

which is itself obtained by condensing together compounds of the formulas $T^1COCH_2CONHZ$ and $T^2CH_2COO$ alkyl.

As specific examples of coupling components of formula II there may be mentioned 2:6-dihydroxypyridine, 2:6-dihydroxy-3-cyano-4-methylpyridine, 1-(methyl or ethyl)-3-cyano4-methyl-6-hydroxypyrid-2-one, 1-($\beta$-hydroxyethyl or $\gamma$-methoxypropyl)-3-cyano-4-(methyl, phenyl or ethyl)-6-hydroxypyrid-2-one, 1-(phenyl, p-tolyl or p-anisyl)-3-cyano-4-(methyl or phenyl)-6-hydroxypyrid-2-one, 1-phenyl-3-(carbonamido or carboethoxy)-4-(methyl or phenyl)-6-hydroxy-pyrid-2-one, 2:6-dihydroxy-3-(carbonamido, carboethoxy, carbodiethylamino)-4-methylpyridine, 2:6-dihydroxy-3-(carbon-amido or carboethoxy)pyridine, 2:6-dihydroxy-3-carbonamido-4-phenylpyridine, 2:6-dihydroxy-3-cyano-4-carbonamidopyridine, 2:6-dihydroxy-3-cyano-4-(carbomethoxy or carboethoxy)-pyridine, ethyl 2:6-dihydroxy-3-cyanopyrid-4-ylacetate, 2:6-dihydroxy-3-cyanopyrid-4-ylacetamide, 2:6-dihydroxy-3:4di(carboethoxy)pyridine, 2:6-dihydroxy-3-carbonamido-4-carboethoxypyridine, 2:6-dihydroxy-4-methyl-pyridine, ethyl 2:6-dihydroxy iso-nicotinate, 2:6-dihydroxy isonicotinamide, 2:6-dihydroxy iso-nicotinic acid diethylamide, 2:6-dihydroxy-4-cyanopyridine, 2:6-dihydroxy- 4-phenylpyridine, 2:6-dihydroxy-4-(p-hydroxyphenyl)pyridine, 2:6-dihydroxy-4-(p-methoxyphenyl)pyridine, 2:4:6-trihydroxypyridine and 2:6-dihydroxy-3-cyano-4-ethoxycarbonyl-methylpyridine.

As specific examples of the other coupling components there may be mentioned phenol itself and o-, m- or p-cresol, o-methoxyphenol, m-acetylaminophenol, o-chlorophenol, o-bromophenol, resorcinol and 2- or 4-hydroxydiphenyl; naphthols such as 1- or 2-naphthol, 4-methoxy-1-naphthol, 6-bromo-2-naphthol, 2-naphthol-6-sulfonamide, 2-acetylamino-7-naphthol, 1-acetylamino-7-naphthol, 2-naphthol-3-carbonamide, 2-naphthol-3-carboanilide and 2-naphthol-3-carboxylic acid o-anisidide; acylacetylamides such as acetoacetanilide, acetoacet-o-, m- or p-toluidide, acetoacet-o-, m- or p-anisidide, acetoacet-o-, m- or p-chloroanilide, acetoacet-o-, m- or p-bromoanilide, benzoylacetanilide, acetoacet-m-xylidide and acetoacet-2:5-dimethoxy-4-chloroanilide, and 5-pyrazolones such as 1:3-dimethyl-5-pyrazolone, but more especially 1-aryl-5-pyrazolones such as 1-phenyl-3-(methyl, carbonamido or carboethoxy)-5-pyrazolone, 1-[2'-, 3'- or 4'-(chloro-, nitro-, bromo-, methyl, methoxy- or sulphonamido-)phenyl]-3-(methyl, carbonamido or carbomethoxy)-5-pyrazolone, 1-[2':5'- or 3':4' -(dichloro)phenyl]-3-methyl-5-pyrazolone and 1-phenyl-3-N-phenylcarbamoyl-5-pyrazolone.

Many of the disazo dyestuffs used in the process of the invention are new compounds in particular the compounds of the following classes:

(a)

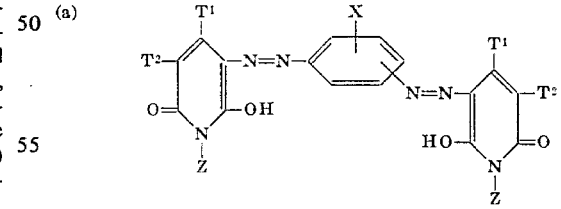

wherein $T^1$, $T^2$ and Z have the meanings stated, and X represents a chlorine or a bromine atom or a methyl or methoxy group (b)

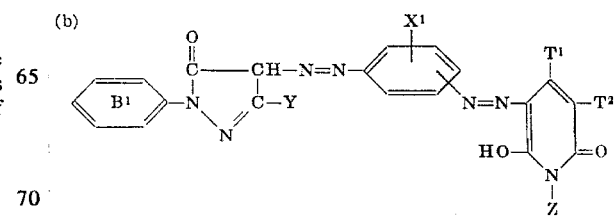

wherein $T^1$, $T^2$ and Z have the meanings stated, $X^1$ is a hydrogen, chlorine or bromine atom or a methyl or methoxy group, Y is methyl, carbonamido, N-substituted carbonamido or a carboxylic acid ester group in particular a carbo lower alkoxy group, and the benzene ring B¹ can contain substituents other than carboxylic acid or sulfonic acid groups.

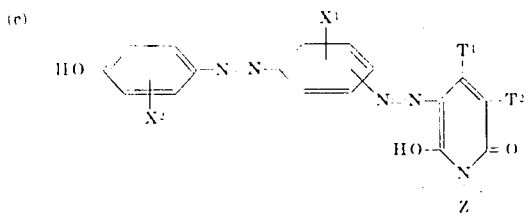

wherein T¹, T², Z and X¹ have the meanings stated, and X² is hydrogen, methyl, methoxy, chlorine, bromine or hydroxy.

One preferred class of the disazo dyestuffs for use in the process of the invention comprises the disazo dyestuffs which, in one of the possible tautomeric forms, are represented by the formula:

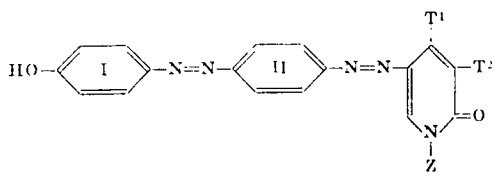

wherein T¹, T² and Z have the meanings stated, the benzene ring I is optionally substituted by lower alkyl, lower alkoxy, chlorine or hydroxy and the benzene ring II is optionally substituted by lower alkyl, lower alkoxy or chlorine.

A second preferred class of the disazo dyestuffs for use in the process of the invention comprises the disazo dyestuffs which, in one of the possible tautomeric forms, are represented by the formula:

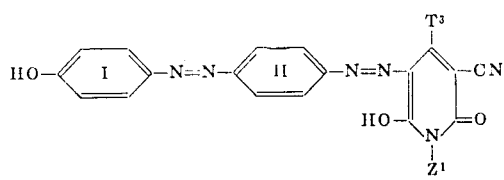

wherein the benzene rings I and II can be substituted as stated above, T³ is lower alkyl, preferably methyl, and Z¹ is optionally substituted lower alkyl, preferably ethyl, β-hydroxyethyl or γ-methoxypropyl, or optionally substituted phenyl.

A third preferred class of the disazo dyestuffs for use in the process of the invention comprises the disazo dyestuffs which, in one of the possible tautomeric forms, are of the formula:

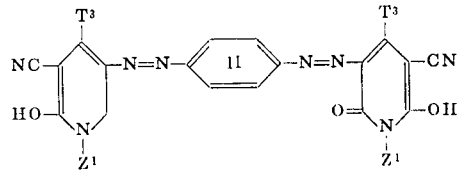

wherein T³ and Z¹ have the meanings stated, and the benzene ring II can be substituted as stated above.

The invention is illustrated but not limited by the following examples in which the parts and percentages are by weight.

EXAMPLE 1

Two parts of 1-(β-hydroxyethyl)-3-cyano-4-methyl-5-[2'-methyl-4'-(3''-methyl-4''-hydroxyphenylazo)-5'-methoxy-phenylazo]-6-hydroxypyrid-2-one (which is obtained as described below) are dispersed in 36 parts of water containing 0.2 part of the disodium salt of bis(2-sulphonaphth-1-yl)-methane by milling in the presence of gravel for 48 hours at 120 r.p.m., and the aqueous dispersion is then separated from the gravel.

One hundred parts of a woven polyethylene terephthalate textile material are immersed in a dyebath comprising 20 parts of the above dyestuff dispersion, 1 part of the sodium salt of a sulfated cetyl/oleyl alcohol mixture and 1 part of the disodium salt of bis(2-sulphonaphth-1-yl)methane in 2500 parts of water, and dyeing is then carried out for 1 hour at 140° C. under superatmospheric pressure. The dyed material is then removed from the dyebath, rinsed in water, treated for 10 minutes in an aqueous solution at 50° C. containing 0.2 percent of sodium hydroxide and 0.1 percent of sodium hydrosulfite rinsed again in water, and is finally dried.

The woven polyethylene terephthalate textile material is thereby dyed a violet shade having excellent fastness properties.

The 1-(β-hydroxyethyl)-3-cyano-4-methyl-5-[2'-methyl-4'-(3''-methyl-4''-hydroxyphenylazo)-5'-methoxy-phenylazo]-6-hydroxypyrid-2-one used in the above example was obtained as follows:

Twelve parts of a 14 percent aqueous solution of sodium nitrite and 50 parts of crushed ice were gradually added to a solution of 5.4 parts of 2-methoxy-4-amino-5:3'-dimethyl-4'-hydroxyazobenzene in a mixture of 30 parts of acetic acid and 5 parts of a concentrated aqueous solution of hydrochloric acid, and the mixture stirred for a further 10 minutes. The mixture was filtered, and the filtrate then added, during 15 minutes, to a solution of 3.88 parts of 1-(β-hydroxyethyl)-3-cyano-4-methyl-6-hydroxypyrid-2-one, 10 parts of sodium acetate, and 0.8 part of sodium hydroxide in 200 parts of water at 15° C. The mixture was stirred for 15 minutes, and the precipitated dyestuff was then filtered off, washed with water and dried.

In place of the 2 parts of the dyestuff used in example 1 there are used 2 parts of the dyestuffs which are obtained by diazotizing the aminoazo compounds listed in the second column of the table and coupling the resulting diazo compounds with the coupling components listed in the third column of the table using methods similar to that described in the last paragraph of example 1. The fourth column of the table lists the shades of the resulting dyeings.

| Example | Aminoazo compound | Coupling component | Shade |
| --- | --- | --- | --- |
| 2 | 4-amino-4'-hydroxyazobenzene | 3-cyano-4-methyl-2:6-dihydroxypyridine | Orange. |
| 3 | do | 1-ethyl-3-cyano-4-methyl-6-hydroxypyrid-2-one | Do. |
| 4 | 4-amino-3'-methyl-4'-hydroxyazobenzene | do | Reddish-orange. |
| 5 | 4-amino-2'-methyl-4'-hydroxyazobenzene | do | Do. |
| 6 | 4-amino-2'-hydroxy-5'-methylazobenzene | do | Do. |
| 7 | 3-chloro-4-amino-3'-methyl-4'-hydroxyazobenzene | do | Orange. |
| 8 | 2-methyl-4-amino-3'-methyl-4'-hydroxyazobenzene | do | Reddish-orange. |
| 9 | 2-methoxy-4-amino-3'-methyl-4'-hydroxyazobenzene | do | Rubine. |
| 10 | 2-methyl-4-amino-5-methoxy-4'-hydroxyazobenzene | do | Red. |
| 11 | 4-amino-2'-4'-dihydroxyazobenzene | do | Red. |
| 12 | 4-(2'-chloro-4'-aminophenylazo)-1-naphthol | do | Red. |
| 13 | 4-(4'-aminophenylazo)-1-naphthol | do | Red. |
| 14 | 1-(4'-aminophenylazo)-2-naphthol | do | Red. |
| 15 | 1-phenyl-3-methyl-4-(4'-aminophenylazo)-5-pyrazolone | do | Orange. |
| 16 | 1-phenyl-3-methyl-4-(2'-methoxy-4'-aminophenylazo)-5-pyrazolone | do | Do. |
| 17 | 1-phenyl-3-carboethoxy-4-(4'-aminophenylazo)-5-pyrazolone | do | Do. |
| 18 | 1-phenyl-3-carbonamido-4-(4'-aminophenylazo)-5-pyrazolone | do | Do. |
| 19 | 1-(p-nitrophenyl)-3-carboethoxy-4-(4'-aminophenylazo)-5-pyrazolone | do | Do. |
| 20 | γ-(2-methoxy-4-aminophenylazo) acetoacetanilide | do | Do. |

| Example | Diamine | Coupling component | Shade |
| --- | --- | --- | --- |
| 21 | γ-(4-aminophenylazo)acet-p-anisidide | do | Do. |
| 22 | γ-(4'-aminophenylazo)acetoacet-m-4-xylidide | do | Do. |
| 23 | 4-amino-4'-hydroxyazobenzene | 1-(β-hydroxyethyl)-3-cyano-4-methyl-6-hydroxypyrid-2-one | Do. |
| 24 | do | 1-(γ-methoxypropyl)-3-cyano-4-methyl-6-hydroxypyrid-2-one | Do. |
| 25 | do | 1-phenyl-3-cyano-4-methyl-6-hydroxypyrid-2-one | Do. |
| 26 | do | 1-benzyl-3-cyano-4-methyl-6-hydroxypyrid-2-one | Do. |
| 27 | do | 1-cyclohexyl-3-cyano-4-methyl-6-hydroxypyrid-2-one | Do. |
| 28 | do | 3-cyano-4-phenyl-2:6-dihydroxypyridine | Do. |
| 29 | do | 1-ethyl-3-carbonamido-4-hydroxypyrid-2-one | Do. |
| 30 | do | 3-cyano-4-carboethoxy-2:6-dihydroxypyridine | Do. |
| 31 | do | 3-cyano-4-carbonamido-2:6-dihydroxypyridine | Do. |
| 32 | do | 3-cyano-4-carbo-N:N-diethylamido-2:6-dihydroxypyridine | Do. |
| 33 | do | 3-cyano-4-carbo-N-phenylamido-2:6-dihydroxypyridine | Do. |
| 34 | do | 3-cyano-4-(piperidin-1'-yl carbonamido)-2:6-dihydroxypyridine | Do. |
| 35 | do | 3:4-dicyano-2:6-dihydroxypyridine | Do. |
| 36 | do | 1-ethyl-3-carboethoxy-4-methyl-6-hydroxypyrid-2-one | Do. |
| 37 | do | 1-ethyl-3-carbo-N:N-diethylamido-4-methyl-6-hydroxypyrid-2-one | Do. |
| 38 | do | 1-ethyl-3-carbo-N-pheynlamido-4-methyl-6-hydroxypyrid-2-one | Do. |
| 39 | do | 1-ethyl-3-(piperidin-1'-yl carbonamido)-4-methyl-6-hydroxypyrid-2-one | Do. |
| 40 | do | 1-ethyl-3-acetyl-4-methyl-6-hydroxypyrid-2-one | Do. |
| 41 | do | 1-ethyl-6-hydroxypyrid-2-one | Do. |
| 42 | do | 1-ethyl-3-phenyl-4-methyl-6-hydroxypyrid-2-one | Do. |
| 43 | do | 1-ethyl-3-(p-chlorophenyl)-4-methyl-6-hydroxypyrid-2-one | Do. |
| 44 | do | 1-ethyl-3:4-dimethyl-6-hydroxypyrid-2-one | Do. |
| 45 | do | 1-(γ-methoxypropyl)-3:4-dimethyl-6-hydroxypyrid-2-one | Do. |
| 46 | do | 1-ethyl-3:4-diphenyl-6-hydroxypyrid-2-one | Do. |
| 47 | 4-amino-3'-methyl-4'-hydroxyazobenzene | 1-(β-hydroxyethyl)-3-cyano-4-methyl-6-hydroxypyrid-2-one | Do. |
| 48 | do | 1-(γ-methoxypropyl)-3-cyano-4-methyl-6-hydroxypyrid-2-one | Do. |
| 49 | do | 1-phenyl-3-cyano-4-methyl-6-hydroxypyrid-2-one | Do. |
| 50 | do | 1-(p-methoxyphenyl)-3-cyano-4-methyl-6-hydroxypyrid-2-one | Reddish-orange. |
| 51 | do | 3-cyano-4-phenyl-2:6-dihydroxypyridine | Do. |
| 52 | do | 1-ethyl-6-hydroxypyrid-2-one | Do. |
| 53 | 2-methyl-4-amino-5-methoxy-4'-hydroxyazobenzene | 1-(γ-methoxypropyl)-3-cyano-4-methyl-6-hydroxypyridine | Bluish-red. |
| 54 | do | 1-ethyl-3:4-dimethyl-6-hydroxypyrid-2-one | Do. |
| 55 | do | 1-ethyl-3-cyano-4-carboethoxy-6-hydroxypyrid-2-one | Do. |
| 56 | 1-(4'-aminophenylazo)-2-naphthol | 1-(β-hydroxyethyl)-3-cyano-4-methyl-6-hydroxypyrid-2-one | Red. |
| 57 | do | 1-phenyl-3-cyano-4-methyl-6-hydroxypyrid-2-one | Red. |
| 58 | 1-phenyl-3-methyl-4-(4'-aminophenyl)-5-pyrazolone | 1-(β-hydroxyethyl)-3-cyano-4-methyl-6-hydroxypyrid-2-one | Orange. |
| 59 | do | 1-phenyl-3-cyano-4-methyl-6-hydroxypyrid-2-one | Do. |
| 60 | do | 3-cyano-4-methyl-2:6-dihydroxypyridine | Do. |
| 61 | 1-phenyl-3-methyl-4-(4'-aminophenylazo)-5-pyrazolone | 1-ethyl-3:4-dimethyl-6-hydroxypyrid-2-one | Do. |
| 62 | 1-phenyl-3-carboethoxy-4-(4'-aminophenylazo)-5-pyrazolone | 3-cyano-4-methyl-2:6-dihydroxypyridine | Do. |
| 63 | do | 1-(γ-methoxypropyl)-3:4-dimethyl-6-hydroxypyrid-2-one | Do. |
| 64 | α-(4-aminophenylazo)acetoacetanilide | 1-(γ-methoxypropyl)-3-cyano-4-methyl-6-hydroxypyrid-2-one | Do. |
| 65 | α-(4-aminophenylazo)acet-p-anisidide | do | Do. |
| 66 | do | 1-ethyl-3-acetyl-4-methyl-6-hydroxypyrid-2-one | Do. |

In place of the 2 parts of the dyestuff used in example 1 there are used 2 parts of the dyestuffs which are obtained by tetrazotising the diamines listed in the second column of the following table and coupling the resulting tetrazocompound with two molecular proportions of the coupling components listed in the third column of the table. The fourth column of the table lists the shades of the resulting dyeings.

| Example | Diamine | Coupling component | Shade |
| --- | --- | --- | --- |
| 67 | p-Phenylenediamine | 3-cyano-4-methyl-2:6-dihydroxypyridine | Rubine. |
| 68 | 2-chloro-p-phenylenediamine | do | Red. |
| 69 | 2-methyl-5-methoxy-p-phenylenediamine | do | Violet. |
| 70 | 2-methyl-p-phenylenediamine | do | Rubine. |
| 71 | 2-methoxy-p-phenylenediamine | do | Do. |
| 72 | p-Phenylenediamine | 1-ethyl-3-cyano-4-methyl-6-hydroxypyrid-2-one | Do. |
| 73 | 2-chloro-p-phenylenediamine | do | Do. |
| 74 | 2-methoxy-p-phenylenediamine | do | Do. |
| 75 | p-Phenylenediamine | 1-(γ-methoxypropyl)-3-cyano-4-methyl-6-hydroxypyrid-2-one | Do. |
| 76 | do | 1-phenyl-3-cyano-4-methyl-6-hydroxypyrid-2-one | Do. |
| 77 | do | 1-benzyl-3-cyano-4-methyl-6-hydroxypyrid-2-one | Do. |
| 78 | do | 3-cyano-4-phenyl-2:6-dihydroxypyridine | Do. |
| 79 | do | 1-ethyl-3-carbonamido-4-methyl-6-hydroxypyrid-2-one | Do. |
| 80 | do | 1-ethyl-3:4-dimethyl-6-hydroxypyrid-2-one | Do. |
| 81 | do | 1-ethyl-3-phenyl-4-methyl-6-hydroxypyrid-2-one | Do. |
| 82 | do | 1-ethyl-3:4-diphenyl-6-hydroxypyrid-2-one | Do. |
| 83 | 2-chloro-p-phenylenediamine | do | Red. |
| 84 | do | 3-cyano-4-(piperidin-1'-yl carbonamido)-2:6-dihydroxypyridine | Red. |

EXAMPLE 85

One hundred parts of a woven aromatic polyester material are immersed in a dyebath comprising a dispersion of 1 part of the dyestuff used in example 4 and a dispersion of 6 parts of o-phenylphenol in 3000 parts of water containing 3 parts of the disodium salt of a dinaphthylmethane disulfonic acid, and dyeing is then carried out for 9 minutes at 100° C. The dyed textile material is then removed from the dyebath and after treated as described in example 1.

The aromatic polyester textile material is dyed a reddish-orange shade of excellent fastness properties.

EXAMPLE 86

A print paste is prepared comprising:

| | |
| --- | --- |
| The dyestuff used in example 4 | 10 parts |
| Gum Tragacanth | 200 parts |
| Water | 790 parts |
| | 1,000 parts | and is then printed into a woven cellulose triacetate textile material by screen printing. The printed material is dried at 60° C. and is then steamed for 3 minutes using saturated steam at atmospheric pressure. The printed textile material is then treated for 5 minutes in a 0.2 percent aqueous solution of a synthetic detergent at 50° C., rinsed in water and dried.

A bright reddish-orange print is thereby obtained which possesses excellent fastness to light and to wet treatments.

A woven secondary cellulose acetate textile material can also be printed with the print paste using the above method.

The above print paste can also be printed onto a woven aromatic polyester textile material, and the material, after being dried, is subjected for 30 minutes to saturated steam at 120° C. A reddish-orange print of excellent fastness properties is thereby obtained.

EXAMPLE 87

One hundred parts of secondary cellulose acetate in the form of yarn are immersed in a dyebath comprising a dispersion of 1 part of the dyestuff used in example 24 in 3000 parts of water containing 3 parts of a condensate of 22 mole of ethylene oxide with 1 mol of cetyl alcohol, and dyeing is then carried out for 1 hour at 85° C. The dyed yarn is then removed from the dyebath, rinsed in cold water and dried.

The yarn is thereby colored an orange shade possessing good fastness to light and to washing.

EXAMPLE 88

A woven aromatic polyester textile material is padded through a liquor comprising 20 parts of the dyestuff used in example 76 dispersed in 1000 parts of water containing 2 parts of a condensate of 9 mols of ethylene oxide with 1 mol of nonylphenol, and the textile material is then squeezed between rollers so that it only retains its own weight of the said liquor. The textile material is dried at 60° C. and is then baked for 1 minute at 200° C. The textile material is then rinsed in water, treated for 10 minutes in a 0.2 percent aqueous solution of a synthetic detergent at 70° C., rinsed again in water and finally dried.

The textile material is thereby colored a bright rubine (a very bluish-red) shade of excellent fastness properties.

EXAMPLE 89

One hundred parts of cellulose triacetate yarn are immersed in a dyebath comprising a dispersion of 1 part of the dyestuff used in example 30 in 3000 parts of water containing 6 parts of diethyl phthalate and 3 parts of the sodium salt of a sulfated mixture of cetyl and oleyl alcohols, and dyeing is then carried out for 90 minutes at 100° C. The yarn is then removed from the dyebath, rinsed in water, treated for 30 minutes in a 0.2 percent aqueous solution of a synthetic detergent at 0° C., rinsed again in water, and is finally dried. The yarn is thereby dyed a bright orange shade of excellent fastness to light and to wet treatments.

Polyhexamethylene adipamide in the form of yarn is dyed by the same method except that the diethylphthalate is omitted from the dyebath and dyeing is carried out at 95° C., instead of 100° C. A bright orange dyeing of excellent fastness properties is obtained.

In place of the dyestuffs used in examples 85 to 89 there can be used any of the other dyestuffs used in examples 1 to 84 whereby similar results are obtained.

The 1-(ethyl, β-hydroxyethyl, γ-methoxypropyl, benzyl or cyclohexyl)-3-cyano-4-methyl-6-hydroxypyrid-2-ones used in the above examples were obtained by condensing together ethylacetoacetate, ethyl cyanoacetate and ethylamine, β-hydroxyethylamine, γ-methoxpropylamine, benzylamine or cyclohexylamine.

The 1-(phenyl or p-methoxyphenyl)-3-cyano-4-methyl-6-hydroxypyrid-2-one were obtained by condensing acetoacetanilide or acetoacet-p-anisidide with ethylcyanoacetate in the presence of sodium ethoxide.

1-ethyl-3-carboxy-4-methyl-6-hydroxypyrid-2-one was obtained by condensing acetoacetethylamide with diethylmalonate in the presence of sodium ethoxide. On treatment with ammonia, diethylamine, aniline or piperidine this compound gave the corresponding amides.

1-ethyl-3-acetyl-4-methyl-6-hydroxypyrid-2-one was obtained by reacting 1-ethyl-4-methyl-6-hydroxypyrid-2-one with acetyl chloride in the presence of aluminum chloride.

1-ethyl-6-hydroxypyridine-2-one was obtained by reaction of ethylglutaconate with ethylamine.

1-(ethyl or γ-methoxpropyl)-3:4-dimethyl-6-hydroxypyrid-2-one were obtained by reaction of ethyl-α:β-dimethyl glutaconate with ethylamine or γ-methoxypropylamine.

1-ethyl-3-(phenyl or p-chlorophenyl)-4-methyl-6-hydroxypyrid-2-one were obtained by reaction of ethylα-(phenyl or p-chlorophenyl)-β-methylglutaconate with ethylamine.

1-ethyl-3:4-diphenyl-6-hydroxypyrid-2-one was obtained by reaction of ethyl α:β-diphenyl glutaconate with ethylamine.

1-ethyl-3-cyano-4-carboethoxy-6-hydroxypyrid-2-one was obtained by condensing the diethyl ester of oxaloacetic acid with cyanoacetethylamide in the presence of sodium ethoxide.

Condensation of ethylacetoacetate, ethyl cyanoacetate and ammonia afforded 3-cyano-4-carboethoxy-2:6-dihydroxypyridine, which on subsequent treatment with ammonia, diethylamine, aniline, and piperidine gave the corresponding amides.

Dehydration of 3-cyano-4-carbonamido-2:6-dihydroxypyridine with $P_2O_5$ gave 3:4-dicyano-2:6-dihydroxypyridine.

3-cyano-4-phenyl-2:6-dihydroxypyridine was obtained by condensing ethyl benzoylacetate and ethyl cyanoacetate with an excess of concentrated aqueous ammonia.

We claim:

1. Process for coloring synthetic textile materials selected from the class consisting of cellulose acetate, polyamide and aromatic polyester textile materials, which comprises treating said textile material with an aqueous dispersion of a water-insoluble disazo dyestuff which is free from sulfonic acid and carboxylic acid groups and which, in one of the possible tautomeric forms, is represented by the formula:

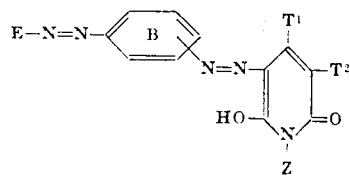

wherein E is a member of the group consisting of hydroxyphenyl, hydroxynaphthyl, 5-pyrazolinyl and acylacetarylamido radicals and a radical of the formula:

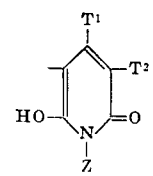

the benzene ring B contains substituents selected from the class consisting of hydrogen, chlorine, lower alkyl and lower alkoxy;

Z is selected from the class consisting of hydrogen lower alkyl, hydroxy lower alkyl, lower alkoxy lower alkyl, phenyl, benzyl and cyclohexyl;

$T^1$ is selected from the class consisting of hydrogen, cyano, lower alkyl, phenyl, carbo lower alkoxy, carbonamido, carbo-N-alkylamido, carbo-N-phenylamido and piperidin-1-yl-carbonamido; and $T^2$ is selected from the class consisting of hydrogen, cyano, acetyl, lower alkyl, phenyl, chlorophenyl, carbo lower alkoxy, carbonamido, carbo-N-lower alkylamido, carbo-N-phenylamido and piperidin-1-yl carbonamido.

2. Process as claimed in claim 1 wherein the dyestuff is of the formula:

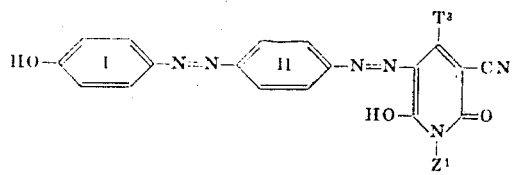

wherein $T^3$ is lower alkyl; $Z^1$ is selected from the class consisting of lower alkyl, hydroxy lower alkyl, lower alkoxy lower alkyl and phenyl; the benzene ring I contains substituents selected from the class consisting of hydrogen, hydroxyl, chlorine, lower alkyl and lower alkoxy; and the benzene ring II contains substituents selected from the class consisting of hydrogen, chlorine, lower alkyl and lower alkoxy.

3. Process as claimed in claim 1 wherein the dyestuff is of the formula:

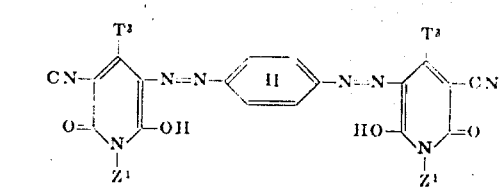

wherein $T^3$ is lower alkyl; $Z^1$ is selected from the class consisting of lower alkyl, hydroxy lower alkyl, lower alkoxy lower alkyl and phenyl; and the benzene ring II contains substituents selected from the class consisting of hydrogen, lower alkyl, lower alkoxy and chlorine.

* * * * *